United States Patent Office

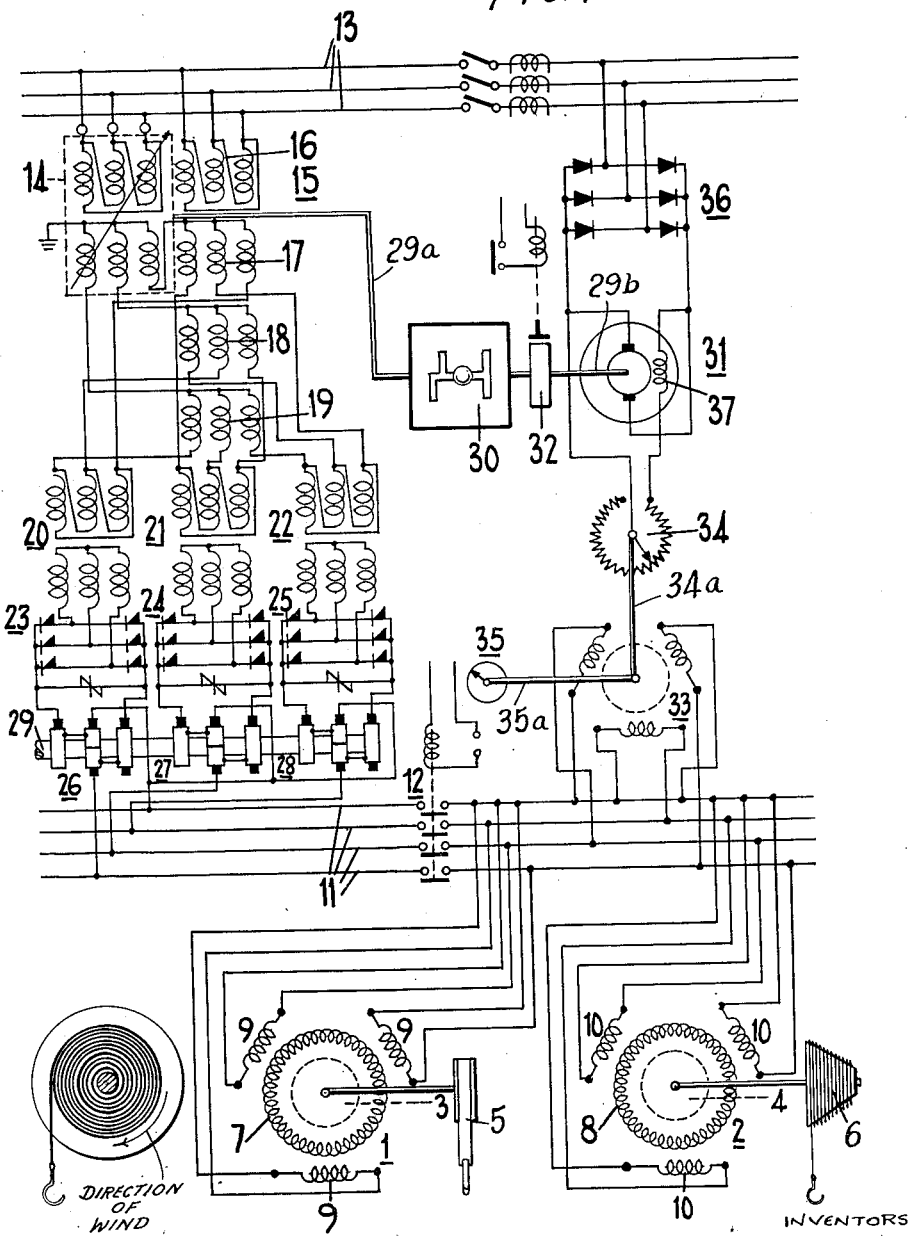

3,015,472
Patented Jan. 2, 1962

3,015,472
ELECTRIC WINCH APPARATUS
Peter Scott, Birmingham, and Bernard Hugh Stonehouse, Orpington, England, assignors to The General Electric Company Limited, London, England
Filed Jan. 10, 1957, Ser. No. 633,465
Claims priority, application Great Britain Jan. 11, 1956
5 Claims. (Cl. 254—168)

This invention relates to electric winch apparatus and an object of the present invention is the provision of such apparatus in which, whilst means are provided to ensure that movement of the load on the apparatus is controlled under power failure conditions, the load may be moved at constant speed when required.

According to one aspect of the present invention, the electric winch apparatus comprises a winch drum the effective diameter of which varies, as a load associated with the apparatus descends and the rope or the like carrying the load unwinds from the drum, a variable speed electric motor arranged to drive the drum and to be supplied from an electric supply, means to control the said supply in dependence upon the said effective diameter of the drum in order to maintain a predetermined winding speed, and means arranged automatically to provide electric braking for the electric motor upon failure of the said supply.

The motor may be a synchronous motor arranged to be supplied by a polyphase A.C. or cyclicly varying D.C. supply and preferably the motor is of the nature described in co-pending patent application Serial No. 633,452, now Pat. No. 2,867,760, for Electric Motors filed January 10, 1957 by Joseph Pritchard Huggard and Peter Scott.

The speed of the motor, if it be a synchronous motor, may be controlled by variation of the frequency of the supply to the motor. If the motor is provided with a permanent magnet rotor for example as disclosed in the said co-pending application, braking of the motor may be achieved either by the provision of a closed stator winding or by connecting the normal stator winding in a closed braking circuit.

In order that the invention may be clearly understood, one example of electric winch apparatus in accordance with the invention will now be described with reference to the accompanying drawings in which FIGURE 1 is a view which shows a pair of electric winch motors arranged to be supplied from the same supply and to drive a common load and FIGURE 2 is an end view of one of the winch drums with a portion thereof removed to show the spiral arrangement of the hoisting rope on said drum. The two motors and their winch drums are arranged to run in synchronism and each drum is required to have a wide, continuously variable speed range and to run at low speeds for long periods. Each motor is arranged to exert sufficient torque when at rest to support the load and, in the event of power failure, the speed of the falling load is arranged to be governed in a predetermined manner.

Referring now to the drawing, the two winch motors 1 and 2 are three phase motors as described in the specification of the said co-pending patent application and the rotor 3 or 4 of each motor 1 or 2 is coupled with a winch drum 5 or 6 either directly as shown or through gearing. Each rotor 3 or 4 has a multi-polar permanent magnet field system and cooperates with a stator having a closed braking circuit winding 7 or 8 and a three phase winding 9 or 10. The two three phase windings 9 and 10 are arranged to be supplied from low frequency alternating current busbars 11 through a four-pole contactor 12 and the motoring speed of the motors is controlled by varying the frequency of the supply to the busbars 11. Each winch drum 5 or 6 is so shaped or arranged that the effective diameter of the drum, i.e. the radius of the drum at the point at which a rope leaves it decreases as the rope unwinds and therefore, under braking conditions, the velocity of a load carried by the rope will decrease and may be reduced to quite a low value at the instant the load reaches its lowest level. This change in the effective diameter of each winch drum may be achieved simply by the rope winding upon itself from say a minimum diameter of the order of one to two inches to a maximum diameter of the order of six to seven inches as indicated by way of example in the case of the drum 5. Alternatively the effective surface of the winch drum may be generally conical in form and arranged so that the point at which the rope leaves the drum approaches the apex of the cone as the rope unwinds as indicated for example in the case of the drum 6. It will be evident that in both cases the hoisting rope is wound in a spiral arrangement —a flat spiral for the drum 5 and a helical spiral for the drum 6—with the diameter of each spiral decreasing in the direction of unwinding.

Upon failure of the supply from the busbars 11 to the motors 1 and 2, the permanent magnet rotors 3 and 4 cooperate with the stator field windings 7 and 8 to exert braking torques but, as will be appreciated, the windings 7 and 8 may be dispensed with and means provided for connecting the three phase windings 9 and 10 of the motors in a closed braking circuit or circuits. Besides providing for electric braking under power failure conditions, the rotors 3 and 4 also provide sufficient torque when stationary to hold the load, the power supply from the busbars 11 then being constant as will be described hereinafter.

The electric supply arrangement for energising the busbars 11 comprises a frequency converter arrangement arranged to be supplied from main A.C. busbars 13 of standard 50 cycle frequency and to energise the busbars 11 with alternating current at a frequency of from zero to say 5 cycles per second. At zero frequency, the rotors 3 and 4 and winch drums 5 and 6 are held stationary and by controlling the frequency, the speed of the rotors 3 and 4 can be controlled. The frequency conversion arrangement forms the subject of co-pending patent application Serial No. 633,453, now Pat. No. 2,891,211, for Electric Supply Arrangements filed January 10, 1957 by Bernard Hugh Stonehouse and it suffices here to say that it comprises an induction regulator 14, a four winding three-phase transformer 15 having a primary winding 16 and three secondary windings 17, 18 and 19, three rectifier transformers 20, 21 and 22 and three full wave rectifying networks 23, 24 and 25 whose output terminals are connected, through commutator-type switching means 26, 27, 28 on a shaft 29 geared to the shaft 29a of the induction regulator 14, to respective phases of the busbars 11.

The rotor of the regulator 14 is arranged to be driven through a four speed gear box 30 by a small direct current electric motor 31 and the gear box 30 may have three forward gears and one reverse gear, the reverse gear speed being the same as the lowest forward gear speed. The speed of rotation of the regulator rotor 14 governs the speed of the winch rotors 3 and 4 and when zero speed is required, an electrically operated brake 32 on shaft 29b is arranged to lock the rotor in a fixed position.

Since the radius of the rope pay off from each winch drum varies, that is, the effective diameter of each drum varies, it is necessary if constant speed of raising or lowering the load is required to relate the speed of the D.C. motor 31 driving the rotor of the regulator 14 to the effective diameter of the drums; thus, when the rope is being wound on a small radius, a higher motor speed will be required. The required relationship is obtained by the use of an auxiliary motor 33 similar to the motors 1 and 2 but unprovided with the closed braking circuit winding, the motor 33 being connected with the busbars 11 and operating a field (or armature) circuit rheostat for the motor 31 through shaft 34a and a winch or load position indicator 35 through shaft 35a. The motor 31 is supplied from the A.C. busbars 13 through a rectifying network 36 and the rheostat 34 controls the excitation of the shunt field winding 37 of the motor 31 in such a manner that constant winding speed is maintained. The variable speed D.C. motor 31 besides providing for constant winding speed, also provides a means of controlling the speed of the regulator rotors, as does the four speed gear box 30, and a wide range in the speed of the regulator rotor may be obtained.

The invention is particularly useful in connection with electric winch apparatus for raising and lowering control rods, i.e. rods of neutron-absorbing material, in nuclear reactors, but this feature of the maintenance of such a predetermined winding speed is not always necessary. It may indeed be an advantage in some cases to keep the speed of rotation of the drum constant while the control rod is lowered into the reactor core. The winding speed, i.e. the speed of travel of the control rod, will thus decrease the more it penetrates the core because of the decreasing effective diameter of the winding drum. As its effect on reactivity increases with the degree of penetration, the speed of penetration and degree of penetration of the control rod can to some extent be balanced.

The operation of the winch apparatus described above will be clear from the preceding description, any suitable winding speed being chosen by choice of a gear speed in the gear box 30. The winch motors 1 and 2 controlling a single load will always remain in synchronism either during driving or during supply failure conditions since their stator windings 9 and 10 are electrically coupled by the busbars 11.

We claim:

1. An electric winch arrangement comprising a winch drum, a hoisting member wound on said drum with the diameter of turns of said hoisting member on said drum decreasing progressively in the direction of unwind, a synchronous electric motor, a source of power supply of variable frequency for said motor, a permanent magnet rotor and stator winding for said motor, a two-way driving connection between said rotor and said winch drum whereby, under power failure conditions, rotation of said drum is transmitted to said rotor, said rotor thereby serving to cooperate with said stator winding to exert a braking force that increases with the speed of unwind so as to control the speed of unwind from said drum.

2. An electric winch arrangement according to claim 1 comprising control means under normal operating conditions controlling said motor responsive to change of diameter of turns of said hoisting member to maintain a substantially constant winding speed of said hoisting means onto or from said drum irrespective of variation of diameter of said turns.

3. An electric winch arrangement as claimed in claim 1 comprising frequency control means, said control means under normal operating conditions adjusting the frequency of said power supply responsive to the diameter of the turns of said hoisting member to maintain the speed of winding of said hoisting member onto or from said winding drum substantially constant.

4. An electric winch arrangement comprising a plurality of mechanically independent winch drums, a hoisting member wound on each said drum with the diameter of turns of each said hoisting member on its associated drum decreasing progressively in the direction of unwind, a synchronous electric motor for each said drum, a permanent magnet rotor and a stator winding for each said motor, common connections between respective stator windings of said motors, a source of power supply of variable frequency, said common connections being adapted for connection to said power supply, and a two-way driving connection between each drum and the rotor of its respective motor, whereby, under power failure conditions, rotation of each drum is transmitted to its respective rotor by unwind of its said hoisting member, said rotors thereby serving to cooperate with said common stator windings to exert a braking force which increases with the speed of unwind so as to control the speed of unwind from the respective drums in synchronism under the conditions of power failure.

5. As a means for automatically governing the speed of unwind of a hoisting member in a winch arrangement under runaway conditions, the provision of a winch drum upon which the hoisting member is wound turn by turn with said turns progressively decreasing in diameter in the direction of unwind, and electric braking means mechanically connected with said drum, said braking means including means for inducing in said braking means a braking force that increases with speed of rotation of the drum so as to control the speed of unwind.

References Cited in the file of this patent
UNITED STATES PATENTS

| | | |
|---|---|---|
| 1,481,882 | Alexanderson | Jan. 29, 1924 |
| 1,551,529 | MacMillan | Aug. 25, 1925 |
| 1,824,607 | Lichtenberg | Sept. 22, 1931 |
| 2,039,870 | Adams | May 5, 1936 |
| 2,440,319 | Wickerham | Apr. 27, 1948 |
| 2,843,543 | Christy | July 15, 1958 |